United States Patent [19]

Angelsen et al.

[11] Patent Number: 4,934,373

[45] Date of Patent: * Jun. 19, 1990

[54] METHOD AND APPARATUS FOR SYNTHESIZING A CONTINUOUS ESTIMATE SIGNAL FROM SEGMENTS OF A GAUSSIAN SIGNAL PROVIDED BY ULTRA SONIC DOPPLER MEASUREMENT ON A FLUID FLOW

[75] Inventors: Bjorn A. J. Angelsen, Trondheim; Kjell Kristoffersen, Oslo, both of Norway

[73] Assignee: Vingmed A/S

[*] Notice: The portion of the term of this patent subsequent to Dec. 24, 2002 has been disclaimed.

[21] Appl. No.: 213,474

[22] Filed: Jun. 30, 1988

Related U.S. Application Data

[63] Continuation of Ser. No. 903,826, Sep. 3, 1986, abandoned, which is a continuation of Ser. No. 606,277, May 2, 1984, abandoned.

[30] Foreign Application Priority Data

May 13, 1983 [NO] Norway .................................. 831719

[51] Int. Cl.$^5$ ................................................ A61B 8/06
[52] U.S. Cl. ............................ 128/661.09; 73/861.25
[58] Field of Search ...................... 128/661.07–661.09; 73/861.25

[56] References Cited

U.S. PATENT DOCUMENTS

| | | | |
|---|---|---|---|
| 4,182,173 | 1/1980 | Papadofrangakis et al. | 128/663 |
| 4,320,765 | 3/1982 | Cathignol et al. | 128/663 |
| 4,324,258 | 4/1982 | Huebscher et al. | 128/663 |
| 4,407,293 | 10/1983 | Suarez, Jr. et al. | 128/663 |
| 4,441,368 | 4/1984 | Flax | 128/660 |

OTHER PUBLICATIONS

Jethwa et al., "Blood Flow Measurements Using Ultrasonic Pulsed Random Signal Doppler Signal", IEEE Transactions on Sonics and Ultrasonics, vols. 0-22, No. 1, pp. 1-11, Jan. 1975.

Coghlan et al., "Improved Real-Time Spectrum Analyser for Doppler-Shift Blood Velocity Waveforms", Medical & Biological Engineering & Computing, May 1979, pp. 316-322.

*Primary Examiner*—Ruth S. Smith
*Attorney, Agent, or Firm*—Ladas & Parry

[57] ABSTRACT

Method and apparatus for synthesizing a continuous estimate signal of a Gaussian signal resulting from ultrasonic Doppler measurement on a fluid flow, from existing segments of the Gaussian signal. The segment signals are first stored and there is at the same time calculated a characteristic frequency parameter for each segment. The frequency parameter is combined with the first stored segment signal for transposition thereof to a base-band at or about the zero frequency point, and this base-band signal is used to generate coefficients in a controlled filter device which on the basis of a broadband input signal gives a synthesized filter output signal which is a substantially Gaussian signal. The filter output signal is multiplied by a weighting or window function for smoothing the transitions between successive segments. Parallel to the above signal processing there is for each segment of the initial Gaussian signal on the basis of said frequency parameter, formed a parameter at each instant which is an estimate of the frequency parameter of the initial signal between the segments, in order to thereby represent the comparatively quick variations in the location of the frequency spectrum of the initial signal. The latter estimated frequency parameter is combined with the smoothed filter output signal so that this is transposed back to the frequency range of the initial signal and thereby constitutes the synthesized continuous estimate signal. The invention primarily is intended for use with ultrasonic blood flow measurement in living biological structures. This method and apparatus may be incorporated into a complete system for investigating circulatory systems, particularly in hospitals.

12 Claims, 7 Drawing Sheets

Fig. 8    Reading in coefficients

METHOD AND APPARATUS FOR SYNTHESIZING A CONTINUOUS ESTIMATE SIGNAL FROM SEGMENTS OF A GAUSSIAN SIGNAL PROVIDED BY ULTRA SONIC DOPPLER MEASUREMENT ON A FLUID FLOW

This is a continuation of co-pending application Ser. No. 06/903,826 filed on Sept. 3, 1986 (and now abandoned), which is a continuation of co-pending application Ser. No. 06/606,277 filed on May 2, 1984 (and now abandoned).

This invention relates to a method and an apparatus for synthesizing a continuous estimate signal from segments of a Gaussian signal provided by ultrasonic Doppler measurement on a fluid flow.

The invention has been developed primarily for use in ultrasonic blood flow measurement in living biological structures. Thus, the method and the apparatus may be incorporated in a complete system for investigating circulatory systems in living biological structures, as described in co-pending Norwegian Patent Application No. 83.1718. In this connection it is also to be mentioned that the present invention is based upon fundamental principles of synthesization as disclosed in Norwegian Patent Application No. 82.1245.

As will appear from the following description and as appearing in part from the above two Norwegian patent applications, it is very important in connection with blood flow measurements, inter alia, to be able to synthesize a substantially Gaussian signal with a time variable autocorrelation function for use in intermittent ultrasonic Doppler mesurements on flowing fluids, including blood which flows in living tissue structures, in order to form a continuous estimate of the intermittent Doppler measurements.

Closer definitions of the method and the apparatus as well as the novel and specific features according to the invention are included in the claims.

In the following description the invention shall be explained more closely with reference to the drawings, in which.

The synthesizer discussed here is generally adapted for the synthesis of a non-stationary, Gaussian signal from segments of another non-stationary, existing, i.e., initial Gaussian signal so that the stochastic properties of the synthesized signal given by the autocorrelation function approximate the stochastic properties of the existing signal. As mentioned, the method may be employed with advantage in blood flow measurement based upon the Doppler effect in backscattered ultrasound from blood. In this case, the Doppler signal will be a Gaussian signal with regular interruptions during short time intervals, i.e. time spaced segment signals and, therefore, there will be a need for replacing the directly measured Doppler signal by an estimated signal, either all the time, i.e. with a continuous estimate signal or during portions of the time, as explained in Norwegian Patent Application No. 82.1245.

The synthesized signal which is produced by the method described in the following, may also be used as an estimate on the basis of segments of the directly measured signal.

Figure 1:
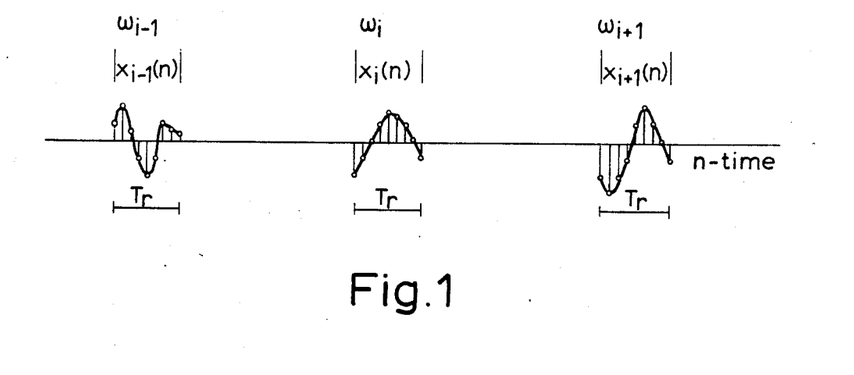
FIG. 1 shows examples of segments of a Doppler signal as it may exist on the output of a high pass filter in a Doppler processor for blood flow measurement.
Figure 2:
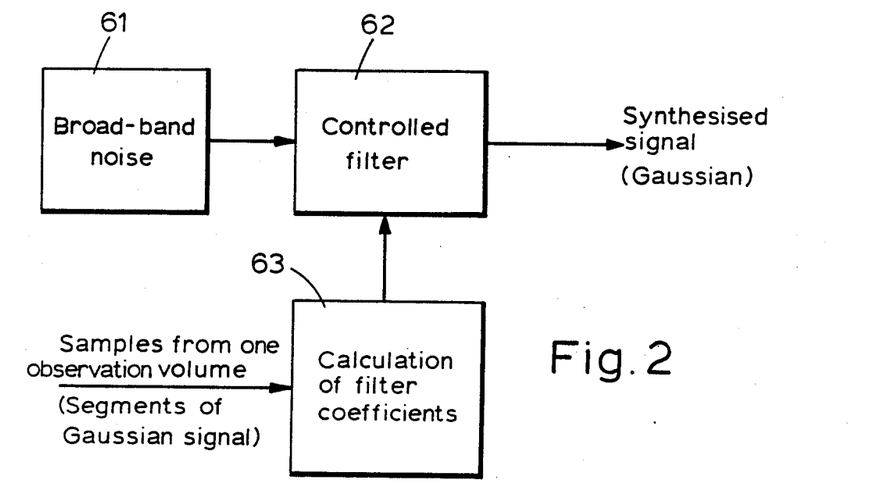
FIG. 2 shows in principle the main structure of a synthesizer based upon an excitation signal in the form of broad-bend or white noise.

A necessary condition is that there are segments signals $\omega_{i<1}$, $\omega_i$ and $\omega_{i+1}$, for example, at regular intervals and each of a length $T_r$ of the Doppler signal from the depth concerned, which are available from the output of the high pass filter of a known Doppler flow-measurement device, as shown in FIG. 1. These segments are used for calculating coefficients, i.e. the transfer function, of a controlled filter, 62 in FIG. 2 to which there is applied a broad-band (substantially white noise) input signal from generator 61 therefor or another suitable excitation, for example a pulse train. The filter output signal of this filter will then be an approximate Gaussian signal, and this is utilized as a synthetic signal. The main structure of the synthesizer is therefore, illustrated in FIG. 2.

The stochastic properties of a non-stationary Gaussian signal are described by the autocorrelation function of $R(t, t_2)$ of the signal. If the signal is stationary, this will be a function of $t_2 - t_1$. Then there may be defined a power spectrum for the signal as the Fourier transform of the autocorrelation function.

For non-stationary signals there may be calculated a short time spectrum over a short time that the signal is substantially stationary. Short time spectra for different sample functions of the same process ensemble will be somewhat different because of stochastic uncertainty in the spectral estimation. There may be performed an ensemble averaging power all short time spectra and this will give the velocity distribution in the sample volume folded with the spectral window used and the transit time window of the blood through the sample volume.

Figure 3:
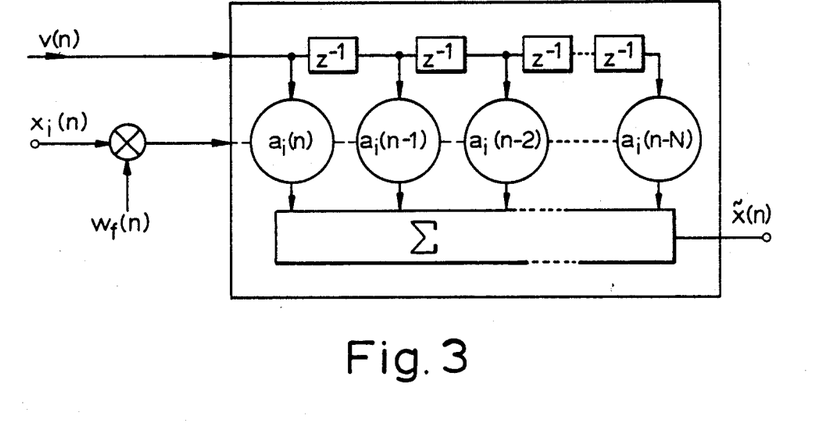
FIG. 3 is a block diagram of a synthesizer with transversal filter, for the synthesis of a stationary signal from segments as for example shown in FIG. 1, FIGS. 4a–b illustrate multiplication of a given signal by a weighting function in order to form filter coefficients for use in the filter of FIG. 3.

First to be described here is how one may synthesize a stationary Gaussian signal having approximately the same spectrum as a given stationary Gaussian signal, from a segment of the given signal. A block diagram of a synthesizer performing this is shown in FIG. 3 for a real signal. N samples of the signal are weighted from a weighting function $w_j(n)$ so that there will be obtained coefficients.

$$a_j(n) = x_j(n) \cdot w_j(n)$$

Figure 4:
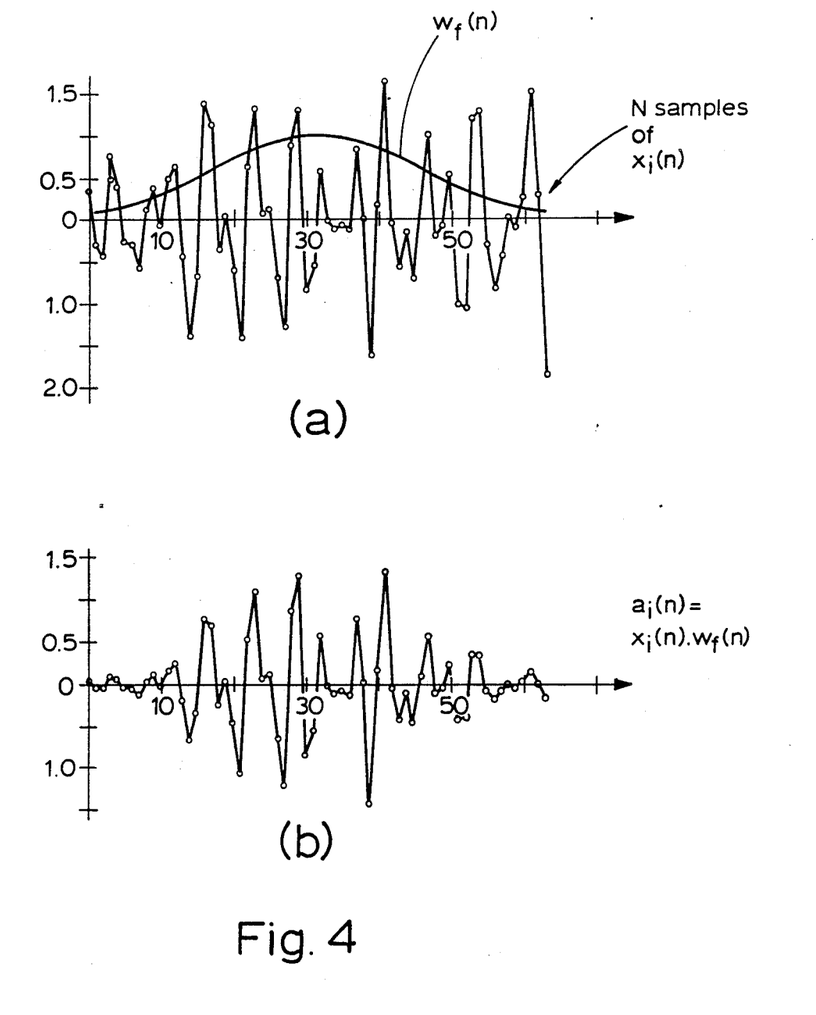

This is illustrated in FIGS. 4a–b. The weighting function is of the same type as used in spectral estimation for reducing the side lobe level and may for example be a Hamming or a Hanning window. It is employed here in order to reduce the side lobe level in the spectrum of the synthesized signal.

The coefficients $a_i(n)$ are used in a transversal filter of the controlled filter to which there is applied the broader (substantially white input signal noise) $v(n)$, as shown in FIG. 3, $x(n)$ is the synthesized signal. $z^{-1}$ indicates storing and delaying the signal by one step in n. $v(n)$ may be broad-band (substantially white) Gaussian noise, but there may also be used broad-band binary noise or another excitation source if the filter has many coefficients as described above. In view of the Central-Limit-Theorem $x(n)$ will then be substantially Gaussian. This has the advantage that in the filter there will only be multiplication by $t_{\pm 1}$, and the delays may be provided for by flip-flops or digital shift registers. The power spectrum of the synthesized signal is $$G_{xx}(\omega) = \frac{1}{N} |F\{w_f(n) x_i(n)\}|^2 \ G_{xx}^* \ |W_f|^2 N$$

in which F{ } indicates the Fourier transform, $W_f(\omega)$ is the Fouier transform of $w_f$, $G_{xx}$ is the power spectrum of x and * indicates folding in the frequency plane. The coefficients given above may also be changed through certain types of linear transforms (all-pass operation) without changing the power spectrum of the synthesized signal. This may have the advantage that the impulse response of the filter is made symmetric, so that the number of multiplications is reduced to the half number, but it has also the disadvantage that there must be performed a linear transform of the coefficients first.

Synthesis of complex Gaussian signals may take place in the same way. $x_i(n)$ will then as a rule consist of a real and an imaginary part. The coefficients $a_i(n)$ correspondingly will have a real and an imaginary part and for real noise there will be obtained a complex synthesized signal $x(n)$. If complex noise is employed, the correlation properties of $x(n)$ will be more similar to those of the Doppler signal.

Two examples of synthesizers for a non-stationary, complex Gaussian signal shall be described below with reference to FIG. 5 and FIG. 9, respectively. It is taken for granted that there exist segments of the initial complex Gaussian signal $x_i(n)$ as shown in FIG. 1. The synthesizers described are in principle of the same type as shown in FIG. 3 for stationary signals, but the filter coefficients are made time variable as will appear from the following. The time variation of the coefficients is calculated on the basis of several segments of the signal $x_i(n)$. For calculating the time variations of the coefficients, advantage is taken of the fact that the time variation of the fluid flow velocity is band limited. The band width of the Doppler signal also changes relatively slowly, whereas the center frequency and the maximum frequency undergo more quick changes. In other words the position of the frequency spectrum is more quickly changed.

The two embodiments shown have the common main feature that there is first synthesized a signal having substantially the correct band-width variation and thereafter this is moved to the range concerned in the frequency plane, by multiplication by a suitable signal.

Figure 5:
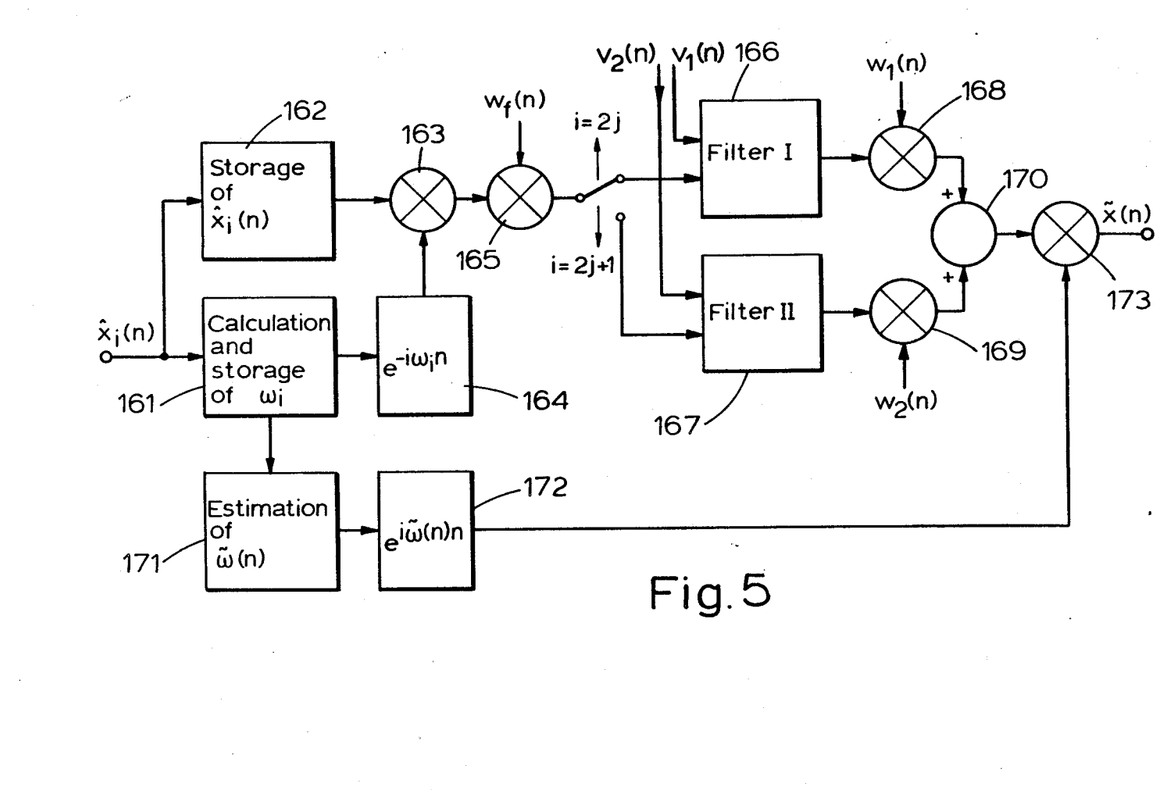
FIG. 5 is a block diagram of a synthesizer corresponding to the apparatus according to the invention, for a non-stationary complex signal.

According to FIG. 5 there is calculated for each segment signal $x_i(n)$ a characteristic spectral, i.e., frequency parameter $\omega_i$ by means of a calculating device 161. At the same time the segment is stored in a storing device 162. The parameter $\omega_i$ may for example be the maximum, the average or the root mean square angular frequency. Since the band width of the signal varies slowly, the difference between the above frequency parameters will vary slowly. All these may therefore be used with a satisfactory result, except when the Doppler signal has elements of a signal from tissue in movement. In such case the maximum angular frequency is preferred because there is little influenced by signals from tissue.

Figure 6:
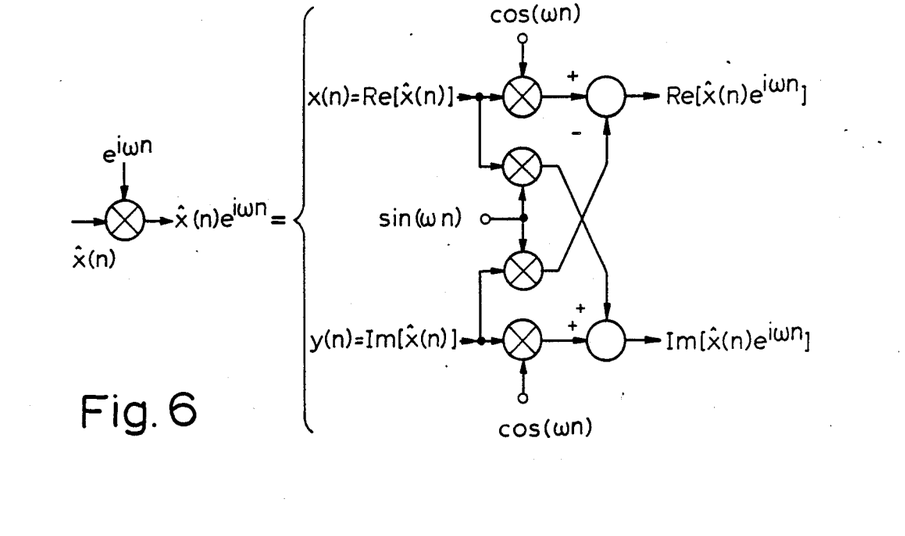
FIG. 6 shows splitting of a complex multiplication involved in the block diagram of FIG. 5, into real operations.

The stored segment, $x_i(n)$ is then multiplied, i.e., mixed in a first multiplication device 163 with a first mixing signal $e \exp(-\omega_i n)$ which represents the characteristic frequency parameter and a mixing signal generate is generated in block 164, which is responsive to the calculating device 161. Thereby the spectrum of $x_i(n)$ is moved down to around zero (in the following designated the base-band) and the change in the short time spectrum due to $\omega_i$ will be removed. The complex multiplication may be carried out as in FIG. 6. The result, i.e., frequency shifted segment signals is then multiplied by, i.e. weighted with a window function $w_f(n)$ in block 165 in the same way as already described for FIGS. 3 and 4. This generates the coefficients, i.e. for the synthesis of a synthesized output signal which is located in the base-band, in the same way as shown in FIG. 3. Block 165 constitutes a second multiplication device the function of which may possibly be combined with the multiplication performed in the first multiplication device 163, since device 165 may be taken as incorporated in block 164, into a more general generating device.

Figure 7:
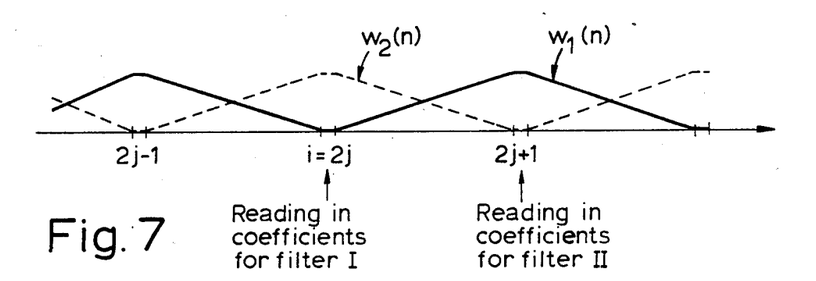
FIG. 7 shows examples of weighting functions for mixing of signals from two filters as shown in FIG. 5.

In FIG. 5 two filters 166 and 167 are illustrated, these filters serving to synthesize the signal in the base-band. The coefficients are loaded into the respective filters for every second segment of the initial signal. The synthesized output signal of the filters is weighted with weighting functions into a filter output signal by means of additional multiplication devices 168 and 169 as illustrated in FIG. 7. This means that the contribution after the summing from the two filters 166 and 167, will be equal to zero when the change of coefficients in the filter concerned, takes place. Because of the gradual change in the window function there will be a gradual transition from the situation in which the synthesized signal is given by the coefficients from one segment, to the situation where it is given by the coefficients for the next segment. In FIG. 7 there are shown windows having linearly increasing edges, but also other windows may be employed, for example a Hamming window or the like. The windows must be zero when reading of coefficients into the filter concerned, takes place. However, this time may be made very short (10–50 μs).

On the basis of the characteristic angular frequencies $\omega_i$ for several segments of the initial signal, there is estimated a continuously variable angular frequency, i.e., estimated frequency parameter $\omega(n)$ in an estimating unit block 171 in FIG. 5. The filter output signal in the base-band after block 170 is then multiplied in a multi unit block 173 by a second mixing signal $e^{i\omega(n)n}$ generated in a second mixing signal generating block 172. Thereby the spectrum is moved from the base-band to the range of interest, i.e., the filter output signal is frequency shifted to the frequency range of the initial Gaussian signal whereby to provide the continuous estimate signal.

A simple method of estimating $\omega(n)$ is by linear interpolation between $\omega_i$ and $\omega_{i+1}$. It may also be formed by filtering a series of values of $\omega_i$, since the change in the characteristic angular frequency is band limited.

When forming $\omega(n)$ by linear interpolation between $\omega_i$ and $\omega_{i+1}$, the loading of the coefficients into the filters 166 and 167 must be delayed by one step so that $\omega_{i+1}$ is present when loading the coefficients from $x_i(n)$. This gives a delay between the synthesized signal and the initial signal, and the practical use decides whether or not this may be tolerated.

A simplified estimator can also employ only one filter instead of the pair of filters in FIG. 5. A proposed weighting function for this case is shown in FIG. 8.

Figure 8:
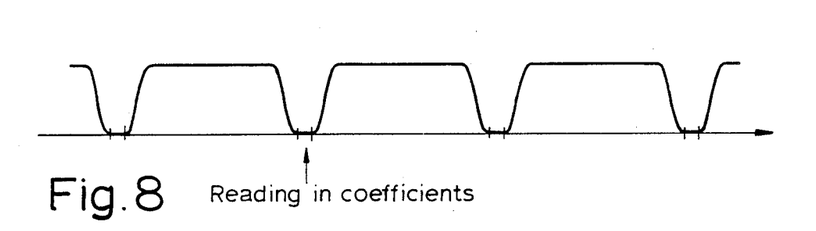
FIG. 8 shows an example of a weighting function when using only one filter in the block diagram of FIG. 5.

The alternative embodiment in FIG. 8 is distinguished from the one in FIG. 5 in that the first multiplication of the signal by exp $(-i\ \omega_i n)$ is eliminated. Instead of this the output from the filters 266 and 267 must be multiplied by two different signals which represent the instantaneous deviation between the spectrum parameter $\omega(n)$ estimated as the time is passing, and the corresponding spectrum parameters $\omega_{2j}$ and $\omega_{2j+1}$ for each of the filter coefficients. More specifically FIG. 9 shows a storing device 262 for the W segment signals. Moreover, there are provided a calculating device 261 and an estimating device 271, these blocks 261, 262 and 271 corresponding to the respective blocks 161, 162 and 171 in FIG. 5. After the storing device 262 there follows a multiplication device 263 which receives the output signal from the device 262 and which has a second input for applying a weighting or window function $w_j(n)$. Thus, it appears that here the segment signals $x_i$ are used directly to form the filter coefficients for the following filter device consisting of the filters 266 and 267. At the output of the filters there are provided additional multiplication devices 273a and 273b, respectively, which also receive respective second frequency-parameter signals $\exp\ i(\omega(n) - \omega_{2j})n$ and $\exp\ i(\omega(n) - \omega_{2j+1})n$ from devices 272a and 272b, respectively, which received a first frequency parameter $\omega(n)$ from the estimating device 271. The filter output signals are thereby transposed back to the frequency range of the initial signal. Then the signals are weighted in the multiplication devices 268 and 269 which are also found at the output of the filters. These multiplications, however, could also be performed immediately after the filters, i.e. in front of the devices 273a and 273b. Finally follows in block 270 a summation or electronic mixing of the signals from the two filters. The order of performing these functions may in part be changed as already indicated, and FIG. 5 shows a succession in which the summing in block 170 precedes the transposing in block 173. In practice the embodiment of FIG. 9 is considered to be most advantageous since it results in a more simple structure of the apparatus. It is obvious, however, that the desired result is obtained in the embodiment of FIG. 5 as well as in the embodiment of FIG. 9, and accordingly it is a question of what is suitable in practice, depending upon inter alia the available technology and components, which alternative should be chosen.

Figure 9:
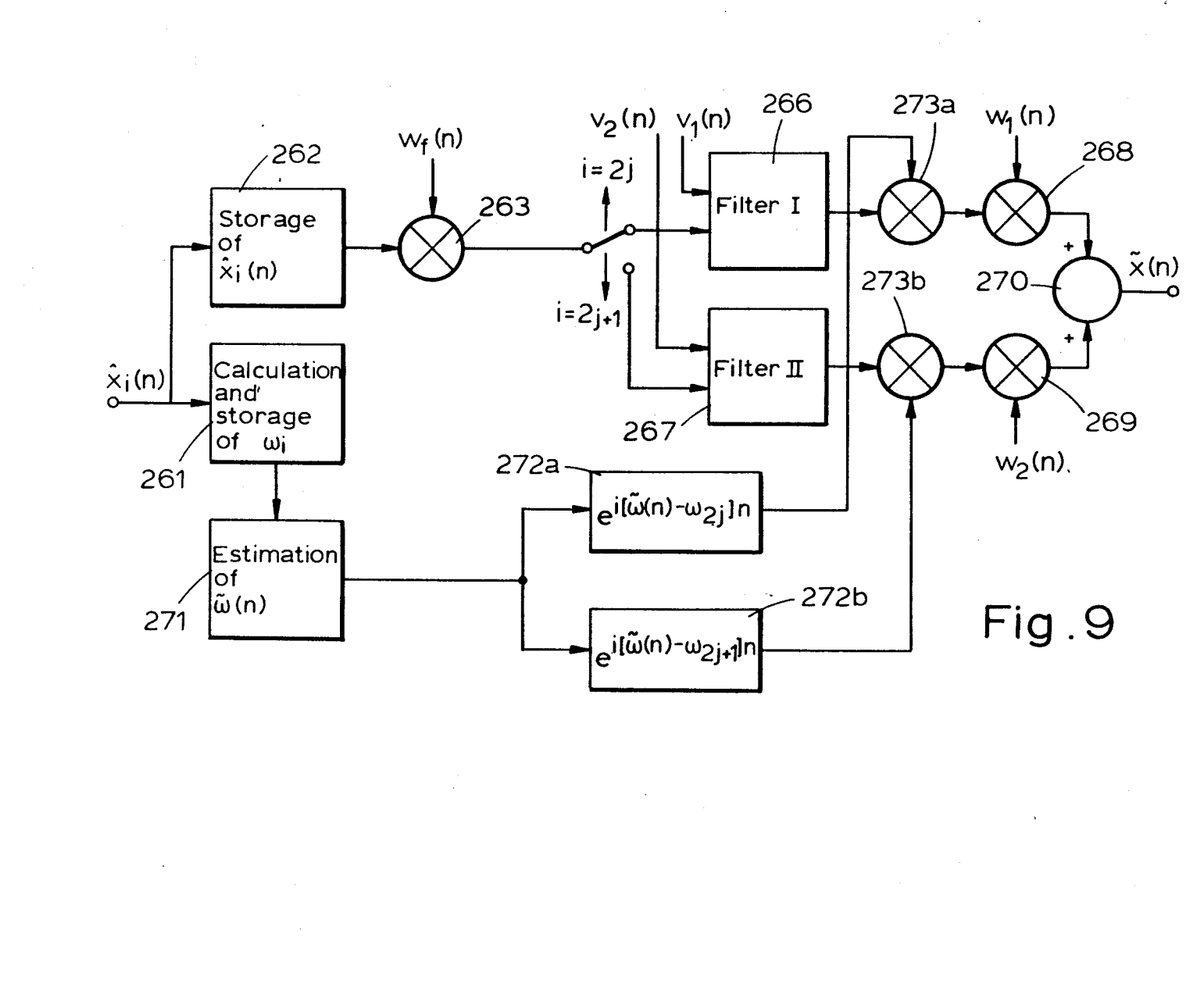
FIG. 9 shows a block diagram which is an alternative to the embodiment according to FIG. 5.
Figure 10:
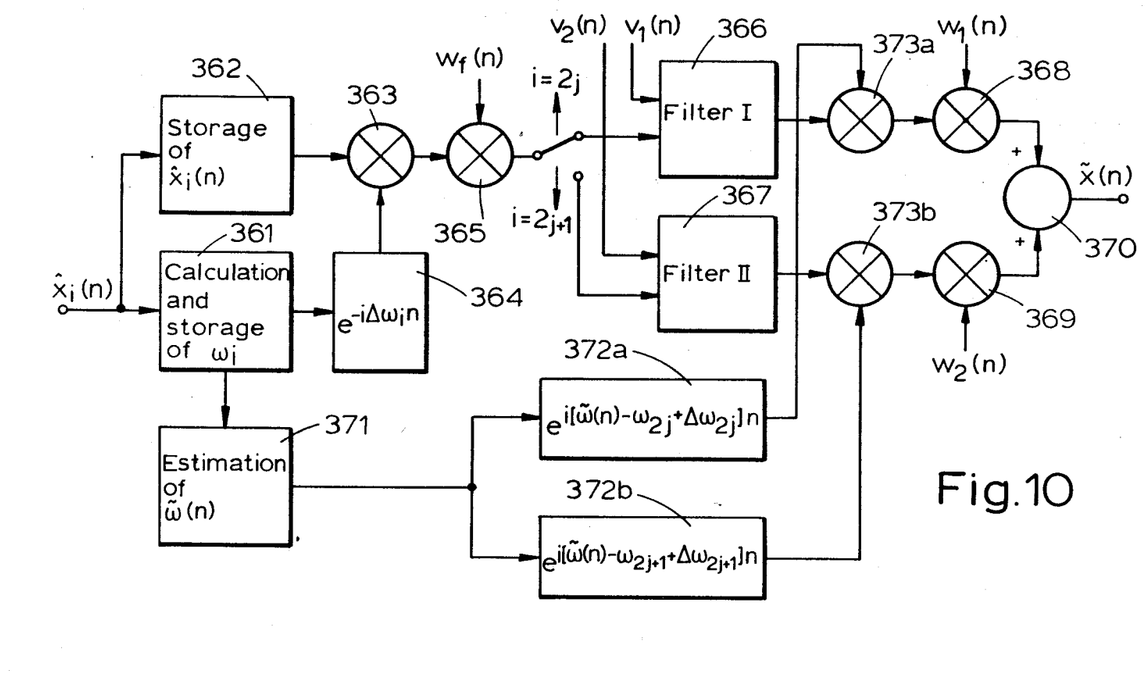
FIG. 10 shows a generalized block diagram which incorporates the embodiment in FIG. 5 as well as the embodiment in FIG. 9.

FIG. 10 shows a block diagram which is generic to the two alternative embodiments in FIGS. 5 and 9. If in FIG. 10 $\Delta\omega_i = 0$, the embodiment of FIG. 9 is obtained, and if $\Delta\omega_i = \omega_i$ the embodiment of FIG. 5 is obtained. In this case the mixing signal after the filters will be the same for both filters so that the multiplication may be carried out after summation. In practice one will choose either $\Delta\omega_i = 0$ or $\Delta\omega_i = \omega_i$ because this results in only two multiplications.

Finally the use of more than two filters may be thought of, in order thereby to better take care of the variations in the band-width of the signal. In such case the alternative with $\Delta\omega_i = \omega_i$ is used, so that only two complex multiplications will be needed.

We claim:

1. Method for real time synthesizing of a continuous estimate signal to be used as a substitute for an initial Gaussian signal obtained during ultrasonic Doppler measurements of blood flow in the circulatory system of a living species, said initial Gaussian signal being available at the output of a Doppler processor only during spaced time intervals as segment signals, whereby said Doppler measurements are interrupted between said spaced time intervals, the method comprising the steps of:

providing segment signals of an initial Gaussian signal to a controlled filter device comprising at least one transversal filter for controlling a transfer function of said controlled filter device;

applying a broadband input signal to said controlled filter device for filtering thereby;

obtaining a synthesized output signal from said controlled filter device, said synthesized output signal being a, substantially Gaussian signal representing the bandwidth variation of said initial Gaussian signal; and deriving a continuous estimate signal from said synthesized output signal.

2. Method according to claim 1, and further comprising weighting said segment signals with a window function before providing the same to said controlled filter device, and wherein deriving said continuous estimate signal comprises using said synthesized output signal directly as said continuous estimate signal.

3. Method according to claim 1, wherein deriving said continuous estimate signal comprises calculating a characteristic frequency parameter for each segment signal, estimating an estimated frequency parameter from said characteristic frequency parameter between said segment signals, and mixing said estimated frequency parameter with said synthesized output signal from said controlled filter device for transposing said synthesized output signals into the frequency range of said initial Gaussian signal as said continuous estimate signal.

4. Method according to claim 3, and further comprising mixing a first mixing signal representing said characteristic frequency parameter with said segment signals into frequency shifted segment signals and then weighting the latter with a window function before providing the same to said controlled filter device.

5. Method according to claim 3, wherein the characteristic frequency parameter is the maximum frequency of the segment signals.

6. Method according to claim 3, wherein the characteristic frequency parameter is the average frequency of the segment signals.

7. Method according to claim 3, wherein the characteristic frequency parameter is the root mean square frequency of the segment signals.

8. Method according to claim 3, wherein calculating the characteristic frequency parameter comprises calculation on the basis of at least two segment signals.

9. Apparatus for real time synthesizing of a continuous estimate signal to be used as a substitute for an initial Gaussian signal obtained during ultrasonic Doppler measurements of blood flow in the circulatory system of a living species, said initial Gaussian signal being available at the output of a Doppler processor only during spaced time intervals as segment signals, whereby said Doppler measurements are interrupted between said spaced time intervals, said apparatus comprising:

a controlled filter device comprising at least one first input, control input and output;

input signal means for applying a broadband input signal to said first input of said controlled filter device;

control signal means for deriving control signals from time spaced segment signals of an initial Gaussian signal;

input means for applying said control signals to said control input of said controlled filter device;

said controlled filter device further comprising at least one transversal filter for receiving said broadband input signal and said control signals applied to said controlled filter device and delivering a synthesized output signal to said at least one output of said controlled filter device, said synthesized output signal being a substantially Gaussian signal which represents the bandwidth of said initial Gaussian signal; and deriving means responsive to said synthesized output signal delivered to said at least one output for deriving a continuous estimate signal from said synthesized output signal.

10. Apparatus according to claim 9, wherein said control signal means comprises:

storing means (162) for storing said segment signals, calculating means (161) for calculating and storing a characteristic frequency parameter for each said segment signal, first mixing signal generating means (164) connected to said calculating means for generating a first mixing signal representing said characteristic frequency parameter, first multiplication means (163) connected to said storing means and said first mixing signal generating means for mixing said segment signals with said first mixing signal to provide frequency shifted segment signals, and second multiplication means (165) having one input connected to said first multiplication means and a second input for applying a window function to said second multiplication means, said second multiplication means being for weighting said frequency shifted segment signals with said window function to provide said control signals, and wherein said deriving means comprises:

third multiplication means (168, 169) having at least one input connected to said at least one output of said controlled filter device and at least one second input for applying at least one, other window function to said third multiplication means, said third multiplication means being for weighting said synthesized output signal with said other window function to provide a filter output signal, an estimating unit means (171) connected to said calculating means for receiving said characteristic frequency parameter from said calculating means and forming an estimated frequency parameter therefrom, said estimated frequency parameter being an estimate of said characteristic frequency parameter between said segment signals, second mixing signal generating means (172) connected to said estimating unit means for generating a second mixing signal representing said estimated frequency parameter, and a multiplication unit (173) at least operatively connected to said second mixing signal generating means and said third multiplication means for mixing said second mixing signal with said filter output signal therefrom to frequency shift said filter output signal back to the frequency range of said initial Gaussian signal, whereby to provide said continuous estimate signal.

11. Apparatus according to claim 10, wherein said controlled filter device comprises two parallel transversal filters and said input means applies control signals corresponding to alternate ones of said segment signals respectively to said two transversal filters.

12. Apparatus according to claim 9, wherein said control signal means comprises:

storing means (262) for storing said segment signals, and input multiplication means (263) having one input connected to said storing means for receiving said segment signals therefrom and another input for applying a window function to said input multiplication means, said input multiplication means being for weighting said segment signals with said window function to provide said control signals, and wherein said deriving means comprises:

calculating means (261) for calculating and storing said characteristic frequency parameter of said segment signals, an estimating unit means (271) connected to said calculating means for receiving said characteristic frequency parameter from said calculating means and forming an estimated frequency parameter therefrom, said estimated frequency parameter being an estimate of said characteristic frequency parameter between said segment signals, at least one generating means (272a, 272b) connected to said estimating unit means for generating a mixing signal representing said estimated frequency parameter, at least one further multiplication means (273a, 273b) connected to said at least one output of said controlled filter device and said at least one generating means for mixing said synthesized output signal with said mixing signal to transpose said synthesized output signal into output signals in the frequency range of said initial Gaussian signal, and at least one still further multiplication means (268, 269) having one input connected to said further multiplication means and a second input for applying still another window function to said further multiplication means, said further multiplication means being for weighting said output signals with said window function to provide said continuous estimate signal.

* * * * *